United States Patent
Hasegawa et al.

(10) Patent No.: US 6,535,515 B1
(45) Date of Patent: Mar. 18, 2003

(54) TCP COMMUNICATION SPEED IMPROVING SYSTEM

(75) Inventors: Teruyuki Hasegawa, Saitamaken (JP); Toru Hasegawa, Shiki (JP); Toshihiko Kato, Saitamaken (JP); Kouhei Yoshiizumi, Tokyo (JP)

(73) Assignee: KDD Corporation, Tokyo (JP)

( * ) Notice: Subject to any disclaimer, the term of this patent is extended or adjusted under 35 U.S.C. 154(b) by 0 days.

(21) Appl. No.: 09/314,710

(22) Filed: May 19, 1999

(30) Foreign Application Priority Data

May 25, 1998 (JP) .......................... 10-143449

(51) Int. Cl.[7] .......................... H04L 12/28; H04L 12/56
(52) U.S. Cl. ................... 370/395.52; 370/401
(58) Field of Search .......................... 370/401, 230, 370/232, 235.1, 254, 356, 392, 395.52, 396, 397, 402, 360, 395.6, 395.65, 386, 389, 395.53; 709/201, 202, 311

(56) References Cited

U.S. PATENT DOCUMENTS 5,920,705 A * 7/1999 Lyon et al. ................ 709/240
5,963,555 A * 10/1999 Takase et al. ............ 370/395.52
6,105,064 A * 8/2000 Davis et al. ................ 709/224
6,181,700 B1 * 1/2001 Doi .......................... 370/395.2
6,247,058 B1 * 6/2001 Miller et al. ................ 709/234
6,252,878 B1 * 6/2001 Locklear, Jr. et al. ........ 370/401

FOREIGN PATENT DOCUMENTS

JP  06038738  3/1994  ........... H04L/12/66
JP  10053676  3/1998  ........... H04L/12/56

* cited by examiner

Primary Examiner—Douglas Olms
Assistant Examiner—Phirin Sam
(74) Attorney, Agent, or Firm—Olson & Hierl, Ltd.

(57) ABSTRACT

A TCP gateway terminates TCP flow control and retransmission control of TCP packets which are input from a transmitter side terminal, in place of a receiver side terminal. Also, the TCP gateway transfers the packet to the TCP gateway which is located on the opposite side, by using selective retransmission procedures in a data link layer using SSCOP and by using peculiar flow control procedures. In addition, the TCP gateway provides the process of transferring the packet to the receiver side terminal in accordance with the TCP process procedures in place of the transmitter side terminal, to a plurality of TCP connections simultaneously.

2 Claims, 12 Drawing Sheets

———— TCP PACKET FOR RELAY PROCESS

──── IP PACKETS (UDP, ICMP, TCP WITHOUT RELAY PROCESS, ETC.) EXCEPT ABOVE TCP PACKET

------ LLC-SNAP ENCAPSULATED PACKETS (IPX, APPLETALK, ETC.) EXCEPT IP PACKETS

\* CONDITION 1 : HTP-DT FOUND IN HTP TRANSMISSION QUEUE ?
\*\* CONDITION 2 : HTP TRANSMISSION WINDOW OPENED ?

FIG. 13

| | LARGE-QUANTITY-OF-DATA TRANSMISSION | SMALL-QUANTITY-OF-DATA TRANSMISSION | TOTAL |
|---|---|---|---|
| NORMAL TCP+TGW | 28.2Mbps | 17.3Mbps | 34.5Mbps |
| TCP WITH WSO | 24.7Mbps | 4.4Mbps | 26.4Mbps |

TCP COMMUNICATION SPEED IMPROVING SYSTEM

BACKGROUND OF THE INVENTION

1. Field of the Invention

The present invention relates to a TCP (Transmission Control Protocol) communication speed improving system which can be employed in a LAN-to-LAN (Local Area Network) communication using a wide area network, etc.

2. Description of the Prior Art

In general, where the LAN-to-LAN communication is carried out by using TCP/IP (Transmission Control Protocol/Internet Protocol) via the wide area network, etc., the mutual connection system called a router, which can handle the processes up to the third layer (network layer) level in the OSI (Open Systems Interconnection) reference model is employed to connect LAN and the wide area network. In the mutual connection system, the protocol processes in the physical layer to the network layer in the OSI reference model have been accomplished, and flow control and error control are carried out between the terminals by using TCP on an end-to-end basis.

In the communication in which the flow control and the error control are carried out between the terminals by using TCP on an end-to-end basis as above, there has been such a problem that throughput which mates with the bandwidth cannot be achieved if delay, error, congestion, etc. are contained or generated in the wide area network. Meanwhile, there has been proposed an approach which can improve the throughput in the network with large delay by introducing a new parameter which is called a "window scale" by extending TCP to implement a large window size. However, in order to utilize the large window size effectively in this approach, not only the extended TCP must be introduced into both communication terminals, but also the window size of TCP must be adjusted in both terminals every communication destination or every application. Furthermore, in order to avoid throughput degradation due to the delay, such an approach has already been proposed in Patent Application Publication (KOKAI) Hei 7-250100, etc. that the mutual connection system is designed to handle the process up to TCP and then the protocol is introduced between the mutual connection systems to achieve the flow control on a link-by-link basis.

In the above-mentioned mutual connection system which can handle the process up to TCP, the protocol with the large window size is employed in order to execute the flow control corresponding to the delay. At this time, since individual flow controls are provided by assigning the large window size to individual TCP connections, if a plurality of TCP connections are to be handled, it is impossible to achieve effective buffer utilization and also there is a possibility that buffer overflow is caused.

SUMMARY OF THE INVENTION

It is an object of the present invention to provide a TCP communication speed improving system which is capable of achieving effective buffer utilization in handling a plurality of TCP connections.

In order to achieve the above object, there is provided a TCP communication speed improving system which is attached to both ends of a wide area network constructed by connecting a plurality of LANs together, the network being able to establish data communication using TCP/IP, the system comprising: a packet processing means which has a packet relay function in a data link layer of an OSI reference model, and provides processes up to TCP in a transport layer in the OSI reference model to a received packet; a terminating means for terminating TCP flow control and retransmission control of TCP packets which are input from a transmitter side terminal, in place of a receiver side terminal; a first packet transferring means for transferring the packet to another TCP communication speed improving system which is located on an opposite side view the wide area network, by using peculiar flow control procedures and selective transmission procedures using service specific connection oriented protocol (SSCOP) in the data link layer; and a second packet transferring means for transferring the packet to the receiver side terminal in accordance with the TCP flow control and the retransmission control, in place of the transmitter side terminal; wherein processes of the terminating means, the first packet transferring means, and the second packet transferring means can be provided simultaneously to a plurality of TCP connections.

In the preferred embodiment of the present invention, in relation to another TCP communication speed improving system which is located on the opposite, each flow control for each TCP connection is carried out based on a large window size according to a delay, while a flow control for all TCP connections is carried out.

In the TCP communication speed improving system, the common sequence number (global sequence number) which is common to all TCP connections for the flow control in all the TCP connections is assigned to the packet independent of the sequence numbers which are assigned to individual TCP connections, and the maximum value of the receivable global sequence number is sent to the opposing side as the credit, based on the maximum value of the previously set data packet which can be held in the system. The transmitter side can transmit the packet until the informed global sequence number is occupied.

Also, when respective TCP connections receive the TCP data packets from the transmitter side terminal, they can transmit the packet to the opposing side if they have space in the transmission window assigned to individual TCP connections and have the global credit. If they do not have the global credit, they manage the transmission queue arranged in every TCP connection.

In addition, in the flow control applied to all the TCP connections, in order to prevent a deadlock which is caused because both systems are brought mutually into the condition to wait the credit, the flow control is not carried out in such a manner that the global sequence number is not updated for the packets such as global credit notification, ACK, SYN, FIN, RST, etc., which are not held in the system and do not include user data.

Moreover, when the transmission to the opposing side is newly enabled by the flow control for all the TCP connections, fairness of the throughput can be ensured by transmitting the packet in the order of windows having larger empty space, the windows being assigned to individual TCP connections.

The nature, principle and utility of the invention will become more apparent from the following detailed description when read in conjunction with the accompanying drawings.

BRIEF DESCRIPTION OF THE DRAWINGS

In the accompanying drawings:

FIG. 13 is a table showing results of communication experiments in compliance with the situation setting 3.

DESCRIPTION OF THE PREFERRED EMBODIMENTS

Embodiments in which a TCP communication speed improving system according to the present invention is applied to LAN-to-LAN communication will be explained with reference to the accompanying drawings hereinafter.

Figure 3:
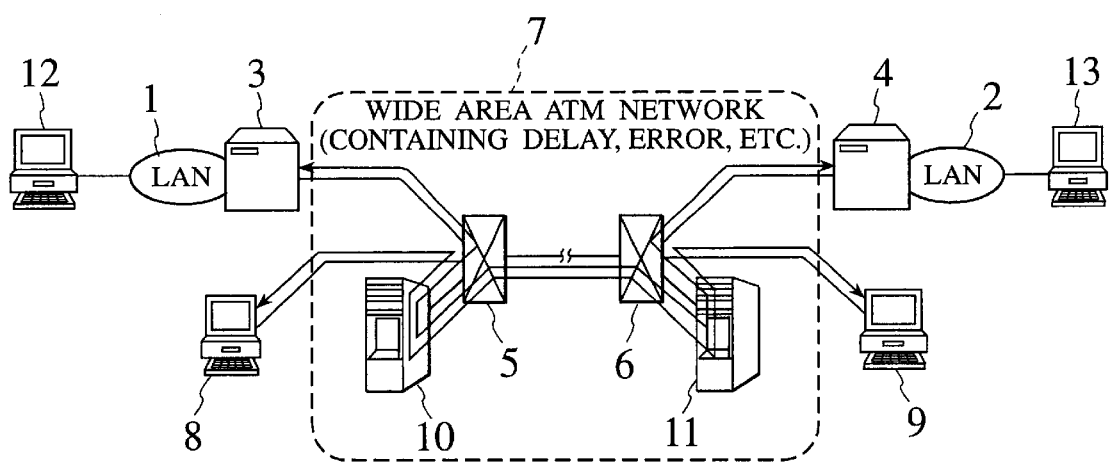
FIG. 3 is a schematic view showing a structure of a wide area ATM network based network system.

FIG. 3 is a schematic view showing a structure of a wide area ATM (Asynchronous Transfer Mode) based network system. ATM terminals 12, 13 are connected respectively to LANs 1, 2 which are physically remotely located. LANs 1, 2 are connected to a wide area ATM network 7 via routers 3, 4. More particularly, LANs 1, 2 are connected to TCP gateways (referred to as "TGWs") 10, 11 via the routers 3, 4 and ATM switching systems 5, 6. Similarly, the ATM terminals 8, 9 which are physically remotely located are connected to the wide area ATM network 7. More particularly, the ATM terminals 8, 9 are connected to TGWs 10, 11 via the ATM switching systems 5, 6 respectively. TGWs 19, 11 can relay the packets in compliance with protocols described in the following.

Figure 1A:
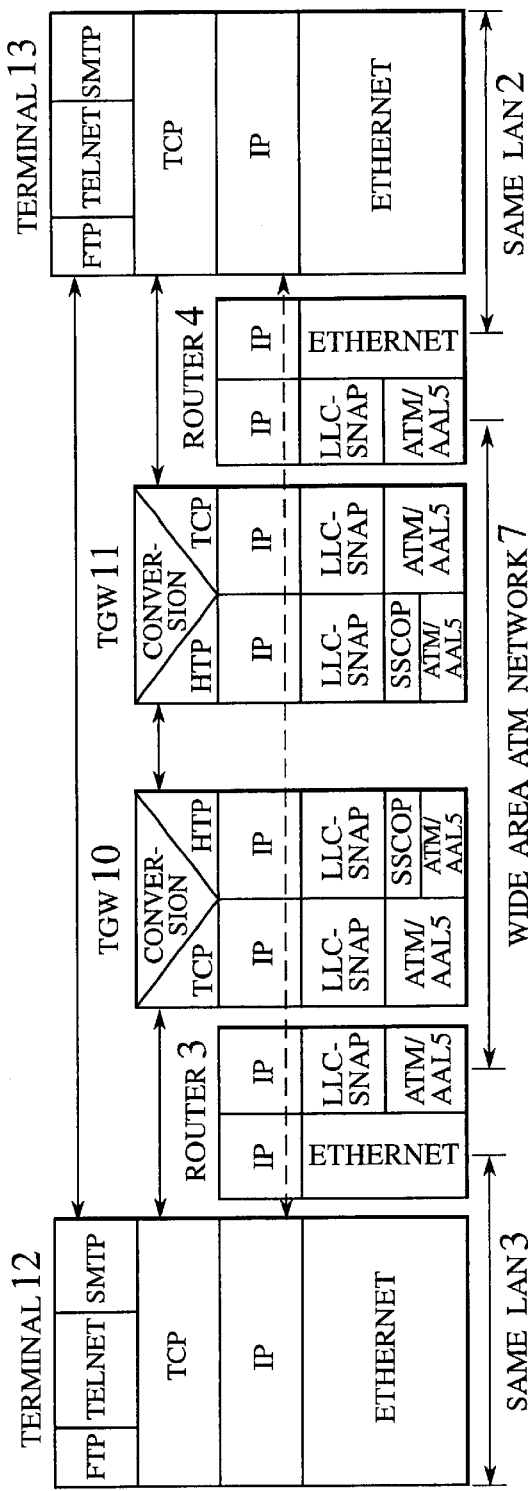
FIGS. 1A and 1B are views each showing a protocol layered structure of a network system according to an embodiment of the present invention.
Figure 1B:
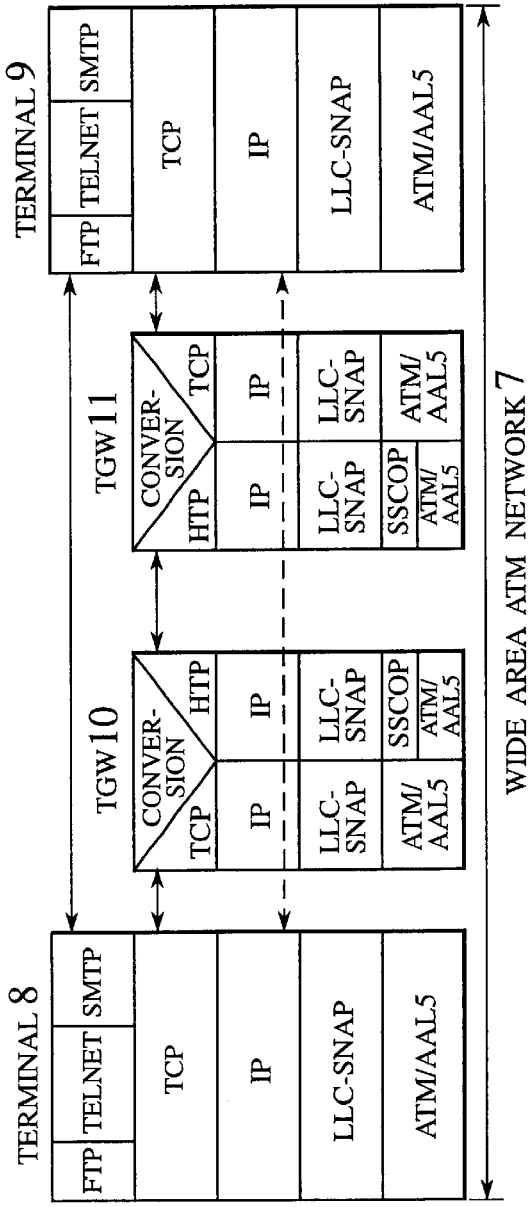
Figure 2:
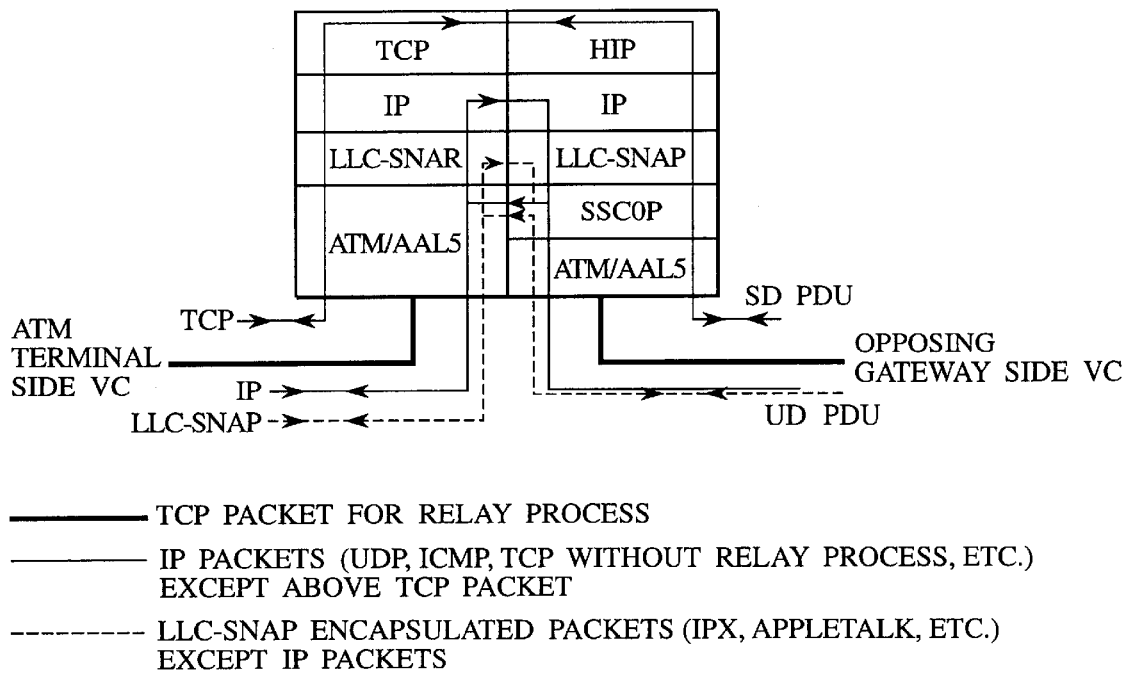
FIG. 2 is a view showing the detailed protocol layered structure of TGW and a packet flow in the TGW.

FIGS. 1A and 1B are views each showing a protocol layered structure of a network system shown in FIG. 3. FIG. 2 is a view showing the detailed protocol layered structure of TGW 10 (11) and a packet flow in TGW 10 (11) shown in FIG. 1.

In this case, FIGS. 1A and 1B show an example where TCP/IP is employed as protocol of the LANs 1, 2 respectively. FIG. 1A shows a protocol stack between the terminal 12 and the terminal 13, and FIG. 1B shows a protocol stack between the ATM terminal 8 and the ATM terminal 9. In FIGS.1A and 1B and FIG. 2, assume that IP portions of TGWs 10, 11 can execute merely addition/deletion of IP header and check of parameters in the IP header, but they do not have an IP routing function. In addition, LLC-SNAP (Logical Link Control-Subnetwork Access Protocol) portions are employed at need.

TGW 10 (11) comprises a packet processing means which has a packet relay function in the data link layer, and provides processes up to TCP in the transport layer to the received packet; a terminating means for terminating the TCP flow control and retransmission control of the TCP packet being input from the ATM terminal 8 on the transmission side in place of the ATM terminal 9 on the reception side; a first packet transferring means for transferring the packet between TGW 10 (11) and TGW 11 (10) which are located via the wide area ATM network 7 to oppose to each other, by using selective retransmission procedures in the data link layer using SSCOP and by using peculiar flow control procedures; and a second packet transferring means for transferring the packet to the ATM terminal 9 in accordance with TCP process procedures in place of the ATM terminal 8. TGW 10 (11) provides processes for the terminating means, the first packet transferring means, and the second packet transferring means to a plurality of TCP connections simultaneously. In particular, TGW 10 (11) can provide the flow control to individual TCP connections based on the large window size corresponding to the delay, and can also apply the flow control to all the TCP connections, with relation to the opposing TGW 11 (10).

Next, procedures taken in TGWs 10, 11 in transferring the packet between the terminals will be explained hereunder.

In this example, assume that the packets have been encapsulated with the use of LLC-SNAP.

1) The ATM terminals 8, 9 or the routers 3, 4 (referred to as "terminals" hereinafter) can output the packet by using the previously defined VCC (Virtual Channel Connection) so as to transfer the packet via the wide area ATM network 7.

2) Both ATM switching systems 5, 6 control VCCs which need the processes in TGWs 10, 11 such that VCCs which are to be essentially established between the terminals can be terminated by TGWs on respective sides. Then, connections between the relay VCCs and the SSCOPS, which are described later, are established separately between TGWs every terminated VCC. TGWs 10, 11 can exchange the packets at a data link level so as to correlate VCC located on the terminal side with VCC located on the opposing TGW side one by one.

3) TGW 10 (11) executes the reliable type data transmission using SD PDU by examining the encapsulated packet which is sent from the terminal 8 (9) by LLC-SNAP, then converting the TCP packet which is to be subjected to TGW process into HTP, and then demanding AA-DATA request to SSCOP. TGW 10 (11) also applies the reverse processes to inputs from the opposing terminal 9 (8). As for the packet which is not to be subjected to the TGW process, TGW 10 (11) executes non-reliable type data transmission using UD PDU by demanding AA-UNITDATA request to SSCOP, and then allows the packet to pass through TGW as it is.

The SSCOP is a reliable type protocol which has a strong selective retransmission function. A need to take account of the HTP packet loss between TGWs can be eliminated by using this SSCOP.

Next, procedures for establishing the HTP connections will be explained hereunder.

Figure 4:
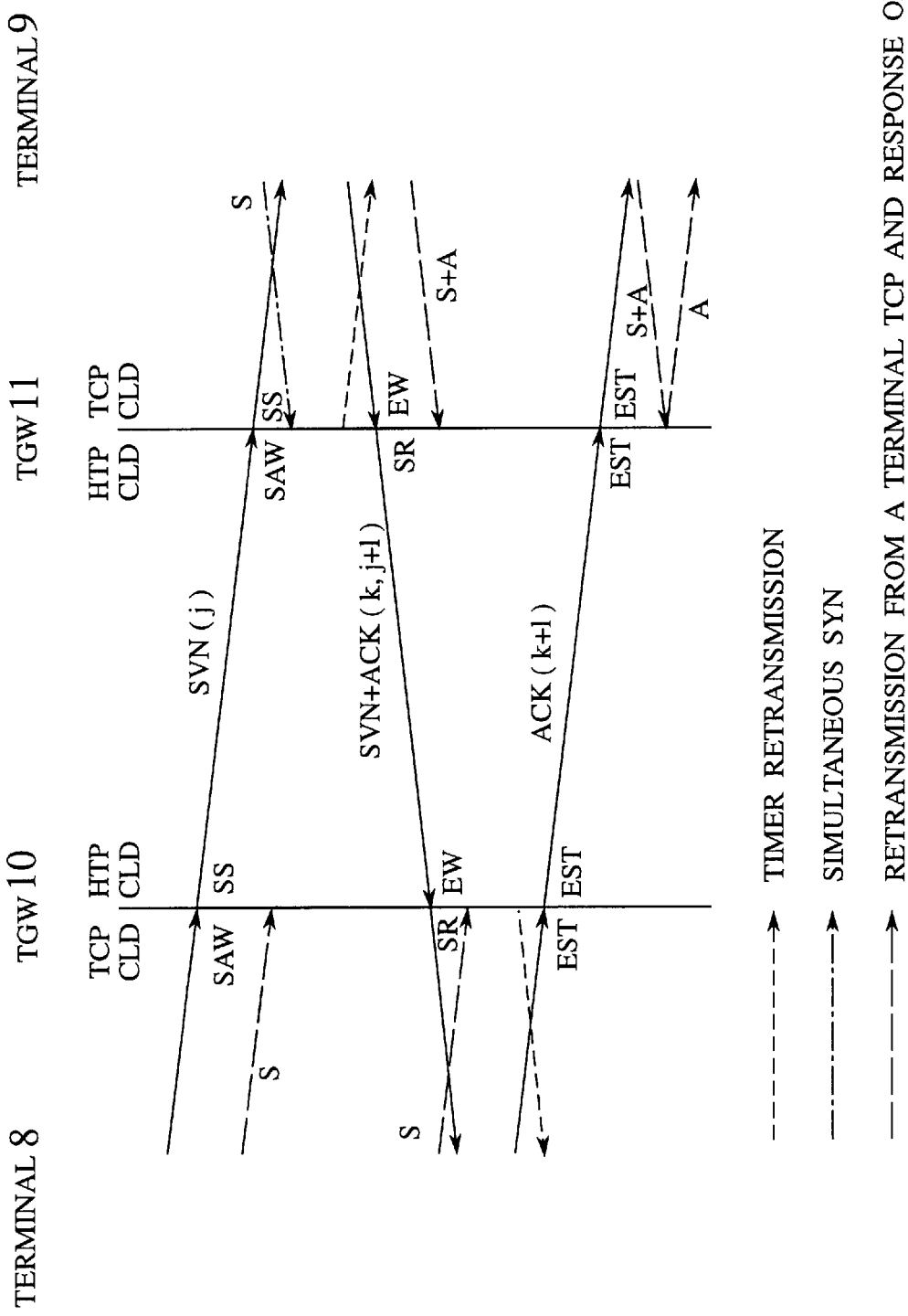
FIG. 4 is a chart showing communication sequences when HPT connections are established.

TGWs 10, 11 establish the HTP connections while executing TCP connection establishing procedures on an end-to-end basis. Communication sequences employed in establishing HTP connections are shown in FIG. 4. Normally the procedures for establishing the HTP connections are given as follows.

1) The connection can be established in TCP by exchanging three packets of SYN, SYN+ACK, and ACK. TGW 10 constructs a connection table to manage the TCP/HTP connection at the time of receiving TCP-SYN from the terminal 8, then rewrites received TCP-SYN into HTP-SYN, and then transmits it to TGW 11. After this, when TGW 10 receives TCP-SYN which is retransmitted from the terminal 8, it can cancel such TCP-SYN.

2) Similarly, upon receiving HPT-SYN, TGW 11 constructs a connection table, then rewrites HTP-SYN into TCP-SYN, and then transmits it to the terminal 9. In this case, when TCP-SYN is lost, such TCP-SYN is transmitted again in response to the timer.

3) Upon receiving TCP-SYN+ACK from the terminal 9, TGW 11 rewrites this TCP-SYN+ACK into HTP-SYN+ACK, and then transmits it to TGW 10. After this, when TCP-SYN+ACK is transmitted again from the terminal 9 before TGW 11 receives HTP-ACK from TGW 10, TGW 11 ignores such TCP-SYN+ACK.

4) When receives HTP-SYN+ACK, TGW 10 rewrites this HTP-SYN+ACK into TCP-SYN+ACK, and then transmits it to the terminal 8. If the TCP-SYN+ACK is lost, such TCP-SYN+ACK is transmitted again in response to the timer.

5) When receives TCP-ACK from the terminal 8, TGW 10 rewrites this TCP-ACK into HTP-ACK, then transmits it to TGW 11, and then completes the establishment of the HTP connection.

6) When receives HTP-ACK, TGW 11 rewrites this HTP-ACK into TCP-ACK, then transmits it to the terminal 9, and then terminates the establishment of the HTP connection. After this, when TGW 11 receives TCP-SYN+ACK (retransmission) from the terminal 9, it responds to this by TCP-ACK.

Next, procedures of releasing the HTP connection will be explained hereunder.

Figure 5:
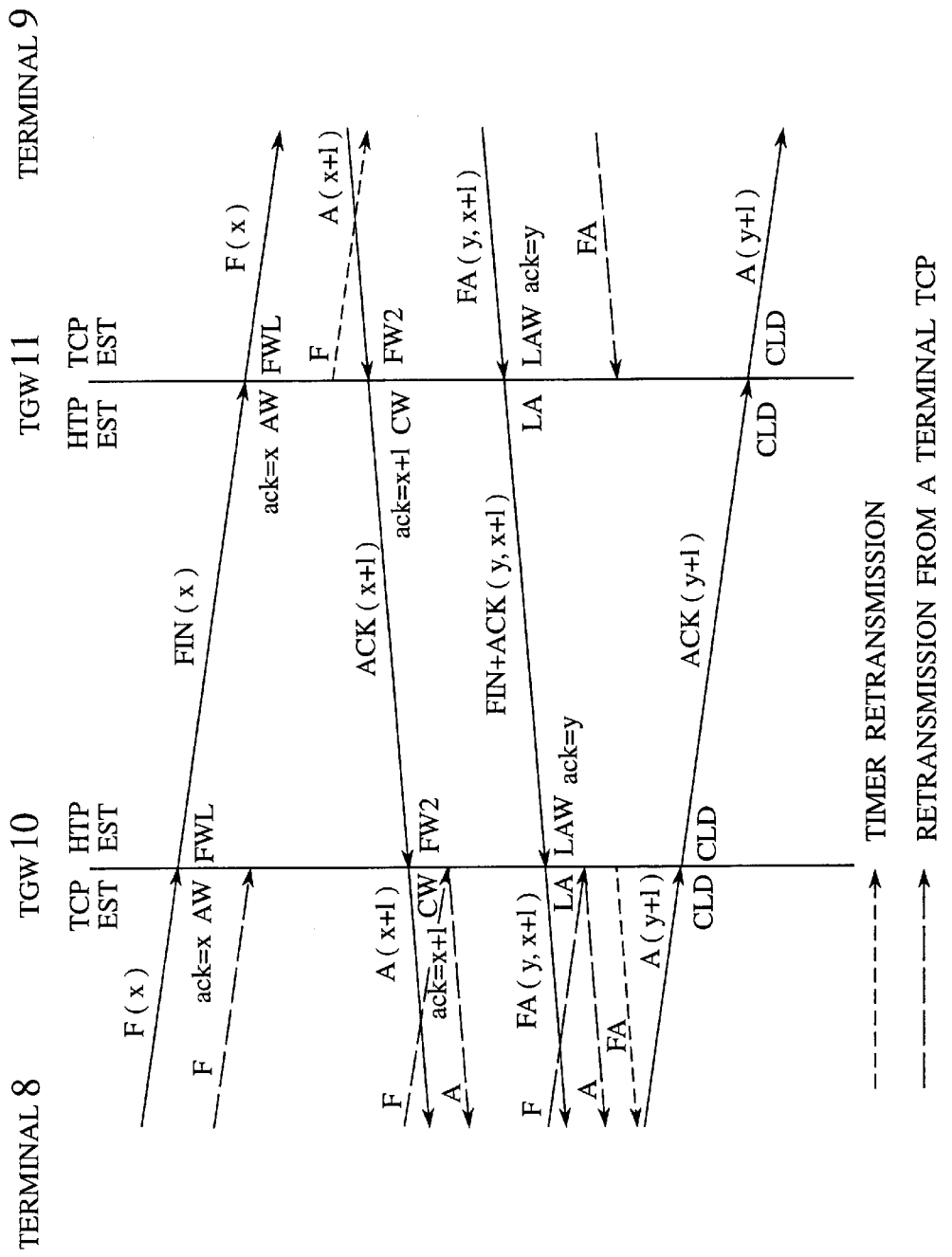
FIG. 5 is a chart showing communication sequences when the HPT connections are released.

The HTP connection release can be achieved while executing the TCP connection release on an end-to-end basis. Communication sequences in releasing the HTP connection are shown in FIG. 5. Normally the procedures are given as follows.

1) In order to release the connection, TCP exchanges FIN and ACK issued against FIN. When receives the first TCP-FIN from the terminal 8, TGW 10 rewrites this TCP-FIN into HTP-FIN and then transmits HTP-FIN to TGW 11 after it has transmitted all HTP data packets. After this, TGW 10 does not send TCP-FIN to the terminal 8 to confirm until it receives HTP-ACK from TGW 11 in response to HTP-FIN.

2) When receives HTP-FIN, TGW 11 rewrites this HTP-FIN into TCP-FIN and then transmits this TCP-FIN to the terminal 9 after it has transmitted all TCP data packets. After this, TGW 11 does not send HTP-FIN to TGW 10 to confirm until it receives TCP-ACK from the terminal 9 in response to TCP-FIN. Also, if TCP-FIN is lost, TGW 11 retransmits such TCP-FIN in response to the timer.

3) Upon receiving TCP-ACK in answer to TCP-FIN, TGW 11 transmits HTP-ACK to TGW 10 in response to HTP-FIN.

4) Upon receiving HTP-ACK in answer to HTP-FIN, TGW 10 transmits TCP-ACK to the terminal 8 in response to TCP-FIN.

5) After the above 4), TGW 10 returns corresponding TCP-ACK in response to the retransmission of TCP-FIN from the terminal 8.

6) After TGW 10 receives the last TCP-FIN from the terminal 9, TGW 10 and TGW 11 execute transmittal confirmation on an end-to-end basis according to similar procedures to those in the above 1) to 4). However, TGW 10 (TGW 11) considers that the HTP connection is released after TGW 10 (TGW 11) has transmitted the last HTP(TCP)-ACK, and deletes the connection table. In this case, even if the last TCP-ACK which has been transmitted to the terminal 9 is lost, TCP-FIN and TCP-ACK can be exchanged on an end-to-end basis without intervention of HTP.

An outline of the flow control in the above HTP will be given as follows.

1) HTP executes the flow control according to the transmission windows which are assigned to individual HTP connections and the global credits which are assigned to all the HTP connections in links (=VCC). These can be updated by using HTP-ACK and HTP-GLCDT from the opposing TGWs respectively.

2) The transmission window is updated when TCP-DT which is kept for retransmission is released in response to the reception of TCP-ACK. TGW informs the opposing TGW of update every time when HTP-DT of the maximum HTP window size (HTP winsize)/N1 [byte] is newly ready for receiving. The HTP winsize and N1 can be set previously. The HTP packet cannot transmit HTP-DT in excess of the transmission window.

3) An outline of the flow control using the global credit will be given as follows.

a) in HTP, the 16-bit sequence number (GSN) which is common to all the connections is informed. Only when the HTP packet with data should be transmitted, HTP increments GSN by one and then transmits it.

b) The packet number which is held by all the connections is managed. The credit (CDT, maximum value of GSN of HTP-DT which is ready for receiving) is informed in unit of packet.

c) HTP is ready for sending when GSN which is assigned to the HTP packet is smaller than CDT. If the transmission is disabled, the HTP couples the connection table to the global transmission queue. The coupling is made in the order of larger empty space of the HTP transmission window. However, GSN for HTP-ACK without data, etc. is not updated, and thus it can be always transmitted out.

d) When HTP-DT is transmitted by the credit update, such HTP-DT is transmitted from the head connection of the global transmission queue. At this time, the connection table which has finished the transmission is re-coupled at an appropriate position (in the order of larger empty space in the HTP transmission window) every transmission of one packet.

e) The opposing TGW is formed of the credit update every time when held TCP-DT is released by receiving the TCP-ACK and the credits of global window size (GL winsize)/N2 [1] can be newly ready for informing. The GL winsize and N2 are set previously.

f) The credit value is set to min (SSCOP max winsize, max global winsize)–(the number of the TCP packet held on the TCP side)+(GSN assigned to the latest received packet).

With the above, a deal of buffer to be prepared in TGW can be limited by the global credit, and windows of individual HTP connections can utilize a value according to the delay if the packet is not stagnated in TGW.

Figure 6:
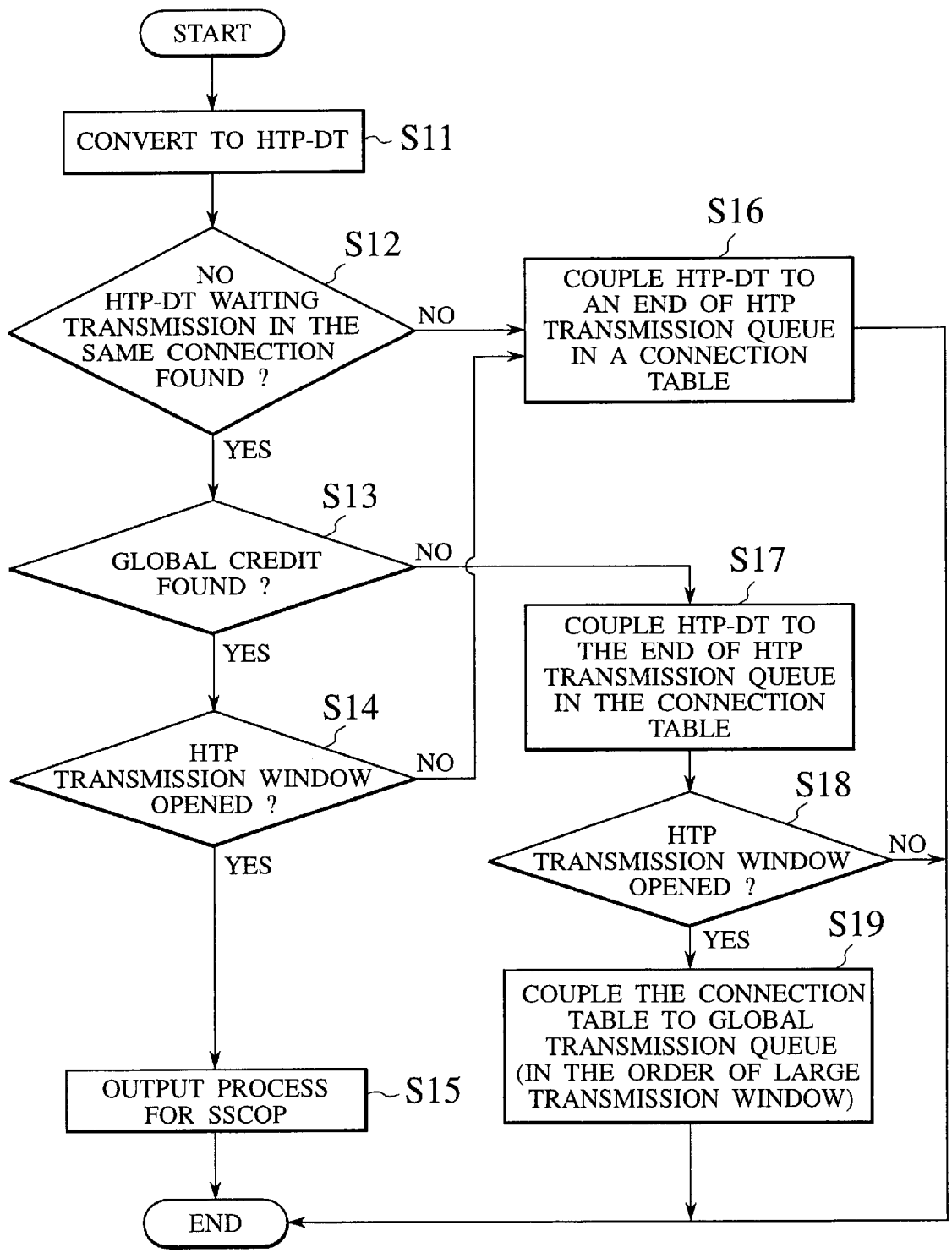
FIG. 6 is a flowchart showing process procedures to input TCP-DT in an HTP-DT transmission.
Figure 7:
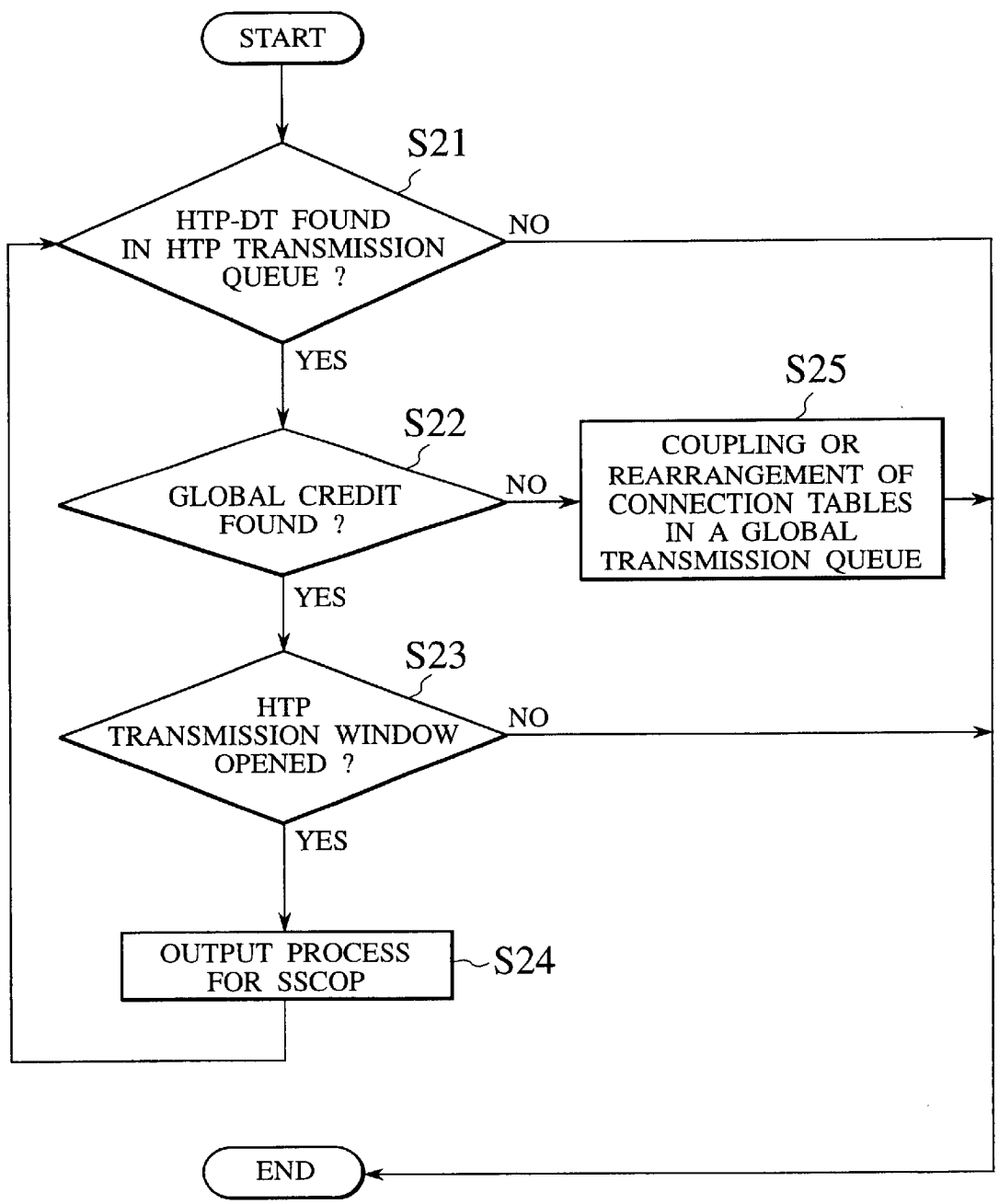
FIG. 7 is a flowchart showing process procedures to update an HTP window in the HTP-DT transmission.
Figure 8:
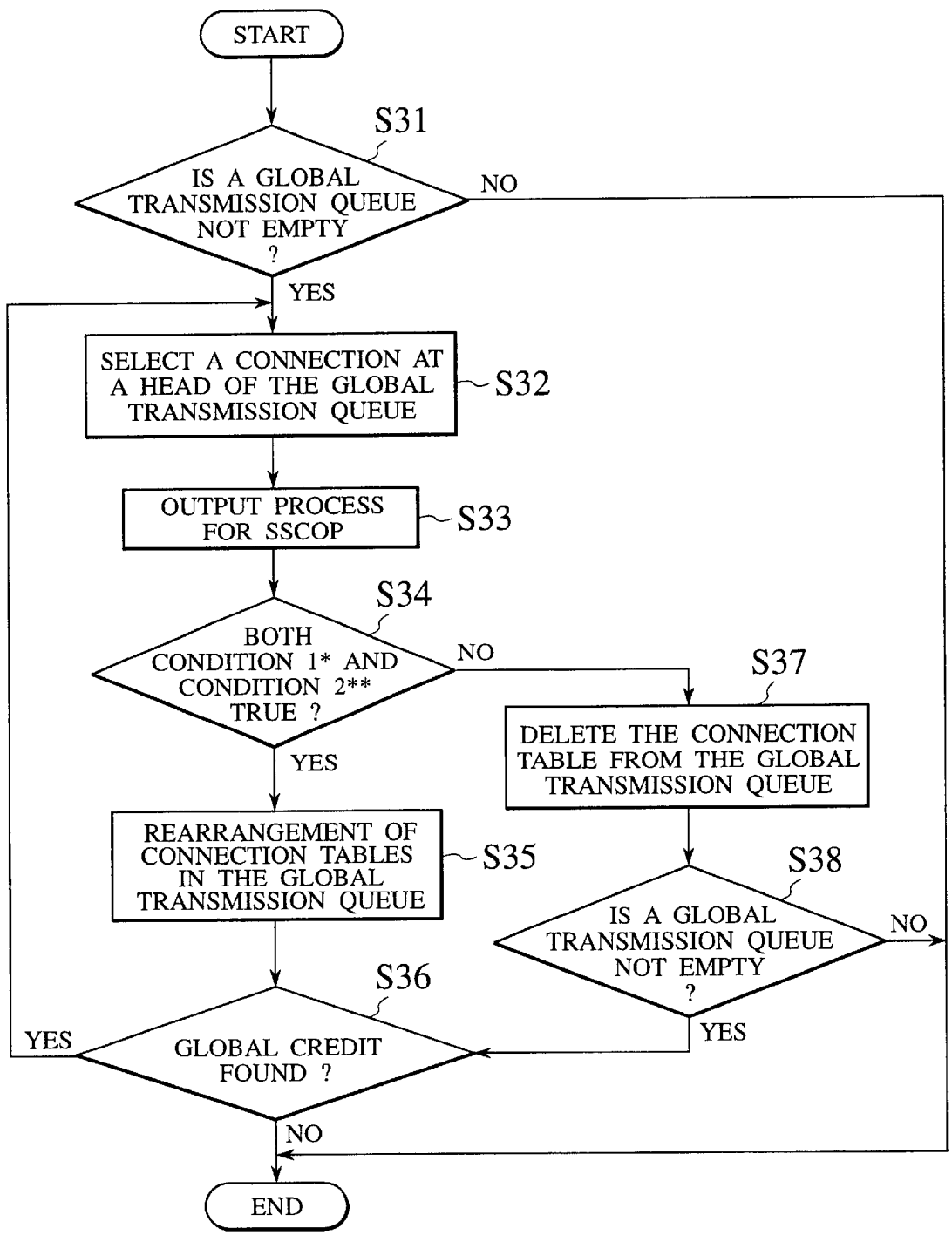
FIG. 8 is a flowchart showing process procedures to update a global credit in the HTP-DT transmission.

FIGS. 6, 7, and 8 are flowcharts showing process procedures of an HTP-DT transmission. The TGW transmits HTP-DT by executing any one of 1) TCP-DT input, 2) HTP transmission window update, and 3) global credit update.

An outline of the process procedures of the HTP-DT transmission will be explained hereinbelow.

1) Procedures for Inputting the TCP-DT (FIG. 6):

The input TCP-DT is converted into HTP-DT (S11). It is checked whether or not HTP-DT waiting the transmission is not present in the same connection table, in other words, whether or not the HTP transmission queue is empty (S12). It is decided in S12 that the HTP transmission queue has not been empty, it is decided that the transmission is disabled based on any flow control, then HTP-DT is coupled to an end of the HTP transmission queue in the connection table, and then the process is ended (S16). In contrast, it is decided in S12 that the HTP transmission queue has been empty, it is checked whether or not the global credit is present (S13). If it is decided in S13 that no global credit is present, HTP-DT is coupled to the end of HTP transmission queue in the connection table (S17). Then, it is checked whether or not the HTP transmission window is opened (S18). If it is decided in S18 that the HTP transmission window has been opened, the connection table is newly coupled to the global transmission queue (in the order of large transmission window) and then the process is ended (S19). On the contrary, if it is decided in S18 that the HTP transmission window has not been opened, the process is ended as it is. If it is decided in S13 that the global credit is present, it is checked whether or not the HTP transmission window is opened (S14). If it is decided in S14 that the HTP transmission window is opened, the output process for SSCOP is carried out (S15). In contrast, if it is decided in S14 that the HTP transmission window is closed, HTP-DT is coupled to the end of the HTP transmission queue in the connection table and then the process is ended (S16).

2) Procedures for Updating the HTP Window (FIG. 7):

It is checked whether or not HTP-DT is present in the HTP transmission queue (S21). If it is decided in S21 that HTP-DT is not present, the process is ended. In contrast, if it is decided in S21 that HTP-DT has been present, it is checked whether or not the global credit is present (S22). If it is decided in S22 that the global credit has not been present, the connection table is re-coupled to the global transmission queue in the order of the window thereof having larger empty space, and then the process is terminated (S25). In contrast, if it is decided in S22 that the global credit has been present, it is checked whether or not the HTP transmission window is opened (S23). If it is decided in S23 that the HTP transmission window has been opened, the output process for SSCOP is carried out (S24) and then the process returns to S21. Conversely, if it is decided in S23 that the HTP transmission window has been closed, the process is ended.

3) Procedures for Updating the Global Credit (FIG. 8):

It is checked whether or not the global transmission queue is not empty (S31). If it is decided in S31 that the global transmission queue has been empty, the process is ended. While, if it is decided in S31 that the connection table is present in the global transmission queue, HTP-DT is picked out or selected from a head of the global transmission queue (S32), and then the output process for SSCOP is carried out (S33). Then, it is checked whether or not either HTP-DT is present in the HTP transmission queue of the output connection or the HTP transmission window is opened (S34). If it is decided in S34 that either the HTP transmission queue has been empty or the HTP transmission window has been closed, the connection table is deleted from the global transmission queue (S37). Then, it is checked again whether or not the global transmission queue is not empty (S38). If it is decided in S38 that the global transmission queue has been empty, the process is ended. In contrast, if it is decided in S38 that the global transmission queue has not been empty, the process is continued via S36. Meanwhile, if it is decided in S34 that both the HTP transmission queue has not been empty, i.e., HTD-DT is present, and the HTP transmission window has been opened, the connection table is re-coupled to the global transmission queue so as to mate with the updated HTP transmission window (S35). Then, it is checked whether or not the global credit is present (S36). If it is decided in S36 that the global credit has not been present, the process is ended. While, if it is decided in S36 that the global credit has been present, the process returns to S32.

Figure 9:
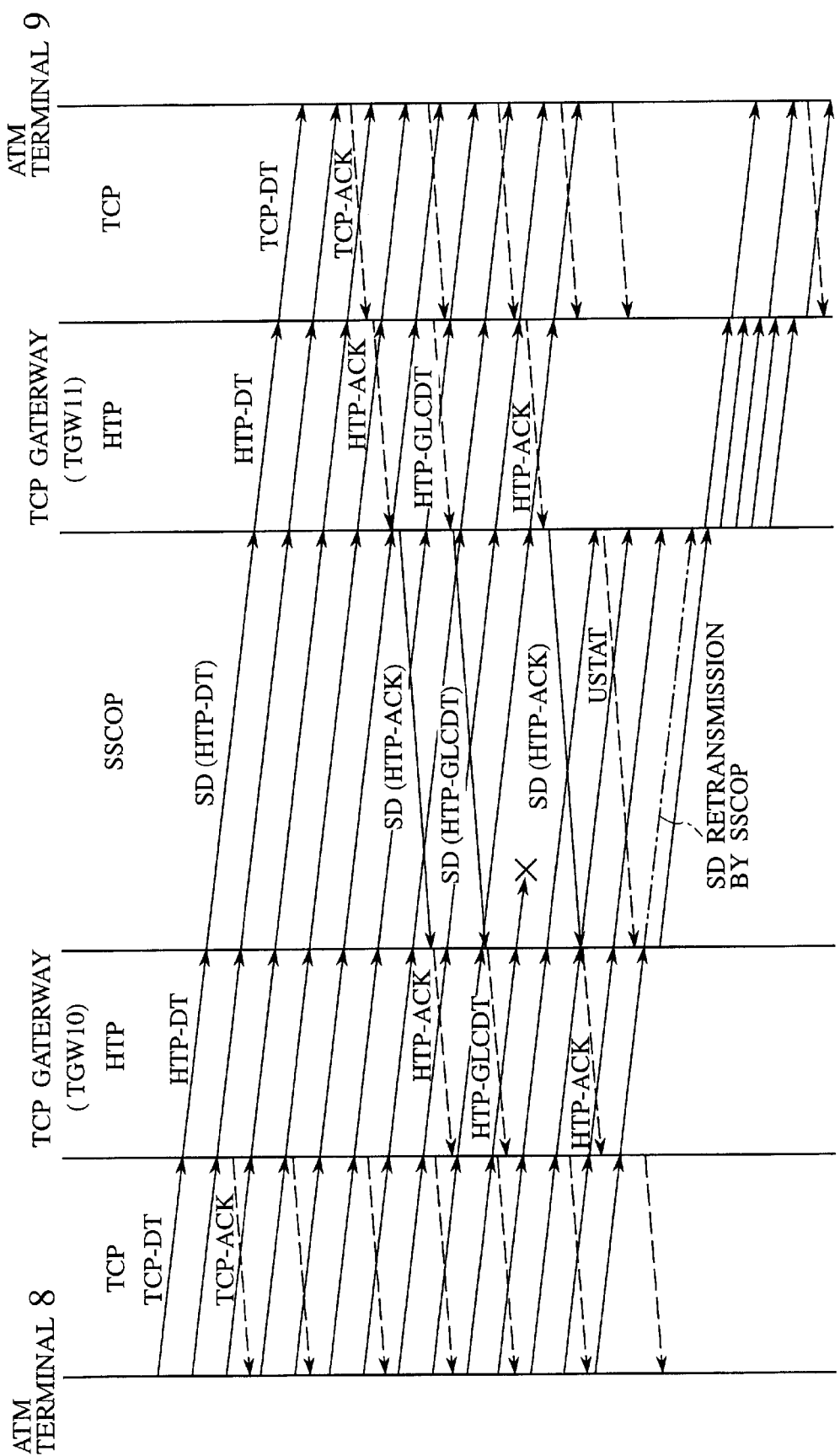
FIG. 9 is a chart showing an example of communication sequences containing a SSCOP sequence in data transmission.

An example of communication sequences containing a SSCOP sequence in data transfer is shown in FIG. 9.

1) TGW 10, when receives the TCP-DT (data) packet from the terminal 8, transmits the TCP-ACK packet to the terminal 8 in compliance with the protocol process of TCP.

2) TGW 10 rewrites received TCP-DT into HTP-DT, and then transmits HTP-DT to TGW 11 in compliance with the flow control of individual connection and the flow control of the overall connections.

3) The HTP packets (HTP-DT, HTP-ACK, HTP-GWN, etc.) are transferred by SSCOP of TGW 10 with the use of SD PDU.

4) TGW 11 rewrites the received HTP-DT into TCP-DT, and then transfers TCP-DT to the terminal 9 in compliance with the protocol process of TCP.

5) TGW 11 transmits HTP-ACK employed to update individual windows or HTP-GWND employed to update the global credit to TGW 10 in answer to the TCP-ACK reception from the terminal 9 every time when a constant quantity of TCP-DT is transmitted to confirm.

6) Loss of SD is detected by exchanging USTAT PDU or POLL PDU and STAT PDU. SSCOP retransmits only the SD which is formed to be lost. HTP does not take account of the retransmission by SSCOP.

Next, results of communication experiments executed by using TGW in the above embodiment will be explained as a particular example hereunder.

1) Experimental System Configuration

Figure 10:
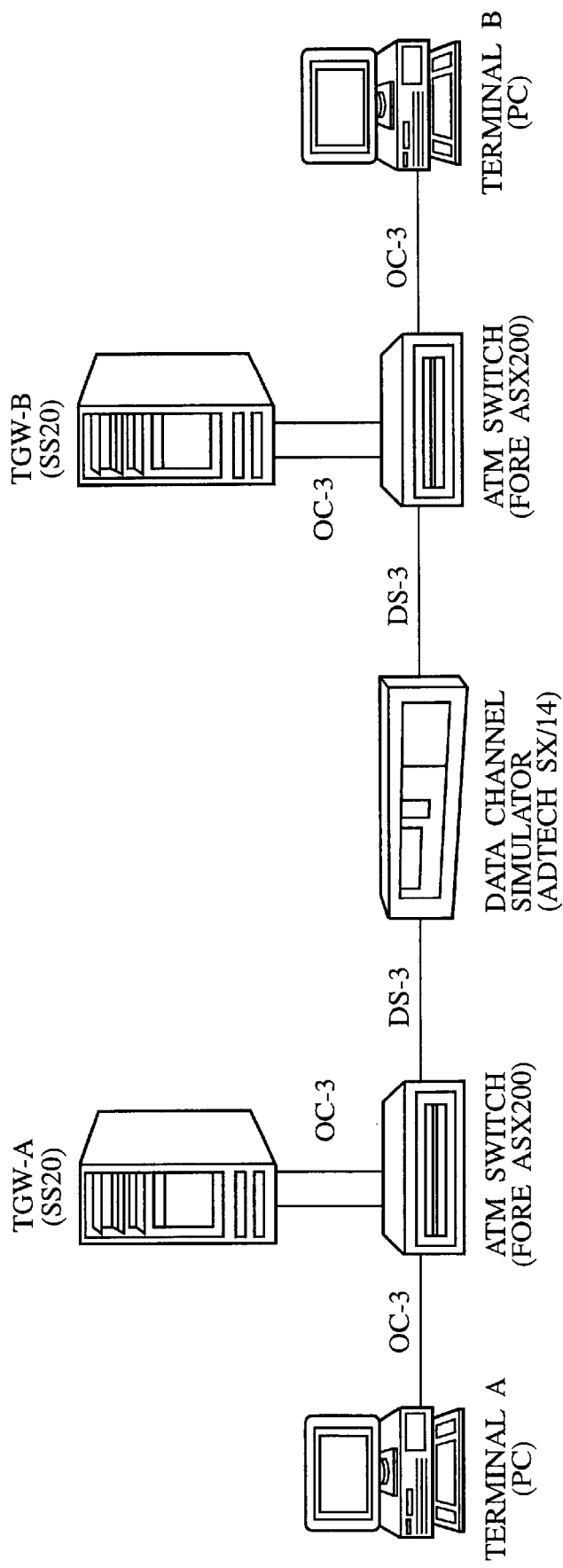
FIG. 10 is a schematic view showing a system structure of a particular example.

In order to verify an advantage of a RCP gateway, a communication experiment has been performed by using a system configuration shown in FIG. 10. More particularly, two SPARC stations 20 (SS20: Super SPARC II 75 MHz, 128 Mbytes, Solaris 2.5.1) each of which has two sheets of ATM boards (FORE SBA200E) are prepared as TGW-A and TGW-B, and two PCs (Pentium II 233 MHz, 64 Mbytes, Solaris 2.6) each of which has a sheet of ATM board (FORE PCA200E) are prepared as a terminal A and a terminal B. TGW-A and the terminal A are connected to an ATM switch (FORE ASX200) via OC-3 lines (155 Mbps), and also TGW-B and the terminal A are connected to another ATM switch (FORE ASX200) via OC-3 lines (155 Mbps). The ATM switches are connected to a data channel simulator (ADTECH SX/14), which can insert the delay and the transmission error into the network, via DS-3 lines (45 Mbps).

2) Experimental Results

Experimental results will be given as follows.

2-1) Comparison of throughputs between the case TGW is provided and the case TGW is not provided when the normal TCP (without the window scale) is employed.
   a) A reciprocating transmission delay (RTT) of 200 msec is inserted into the DS-3 line.
   b) The condition without TGW can be implemented by turning back two OC-3 lines which connect TGW and the ATM switch immediately before the OC-3 lines are input into the TGWs.
   c) The window size of TGW for individual HTP connections is set to 1 Mbyte, and the maximum value of the global credit is set to 2048.
   d) The window size of TCP is set to 36560 bytes (default value).

2-2) Comparison of throughputs between the TCP with the window scale (without TGW) and the TGW+normal TCP under the circumstances including the transmission error.
   a) The same conditions as those in 2-1). a) to c) are employed.
   b) In the case of the TGW+normal TCP, the window size of TCP is set to 36560 bytes. The window size of TCP which supports the window scale is set to 1 Mbyte.
   c) The number of TCP connections is 1 to 4.
   d) In the case of TCP with the window scale, in order to prevent the congestion on the DS-3 line, traffic shaping is applied such that the data can be sent out from the terminal at a rate to mate with the DS-3.
   e) BER=0 (no bit error rate). The random bit error having an error rate 1E-9, 1E-8, or 1E-7 is inserted.

Figure 11:
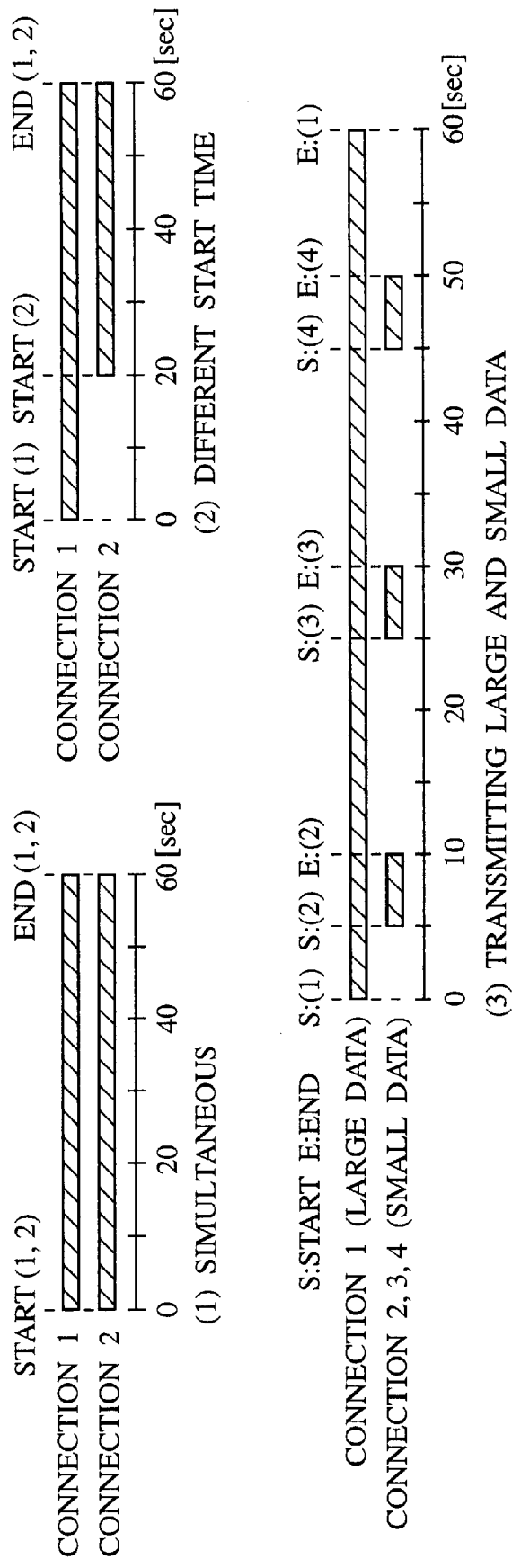
FIG. 11 is a view showing contents of three situation settings 1 to 3 in the particular example.

2-3) Comparison of throughputs between the TCP with the window scale (without TGW) and the TGW+normal TCP under the circumstances including the congestion.
   a) The same conditions as those in 2-2). a) and b) are employed.
   b) The traffic shaping is not applied (data are transmitted at a rate of the OC-3) to the terminal. In this case, there is a possibility that the congestion is generated at the output queue for the DS-3 line in the ATM switch.
   c) As shown in FIG. 11, the communications are carried out under three situation settings, i.e., 1) the communications are started and ended at the same timing (simultaneous), 2) the communications are started at different timings but ended at the same timing (different start time), and 3) the combination of a large quantity of data transmission and a small quantity of data transmission (transmitting large and small data).

3) Results 3-1) Comparison with the normal TCP

In the case of the normal TCP, the throughput has been 1.47 Mbps in the communication without TGW, but the throughput has been able to be increased up to 33.5 Mbps in the communication with TGW.

3-2) Comparison with TCP with window scale option (including random bit errors).

Figure 12:
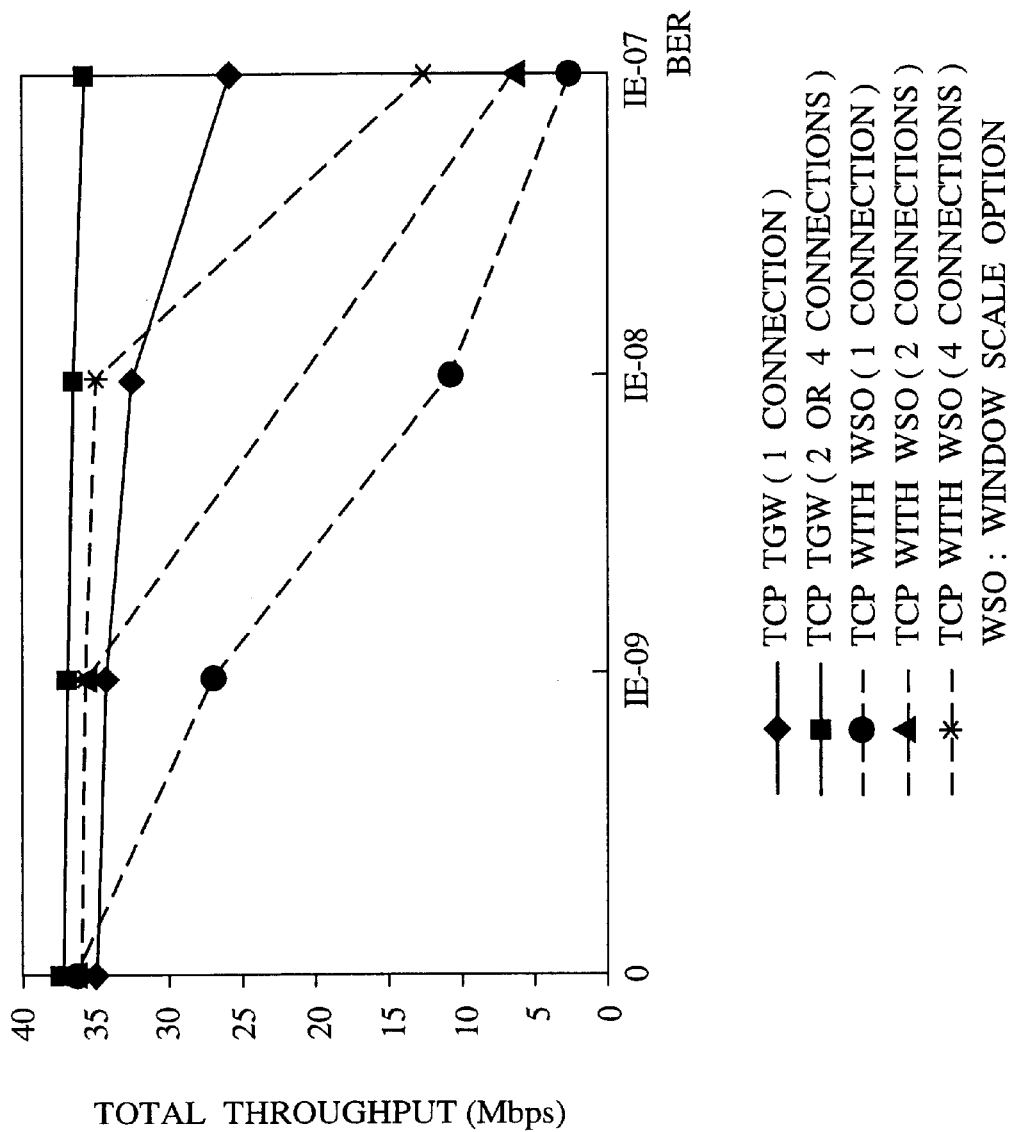
FIG. 12 is a graph showing experimental results of TCP with window scale options and the normal TCP and TGW when a random bit error is inserted.

Experimental results of TCP with the window scale option and the normal TCP+TGW when the random bit error is inserted is shown in FIG. 12. An ordinate of FIG. 12 indicates the throughput (total throughput) and an abscissa of FIG. 12 indicates the bit error rate (BER). In other words, this graph show respective rates which can be implemented under the mimic circumstances having the bit error rates 1E-09 to 1E-07, wherein solid lines represent results of throughput in the present invention, and broken lines represent results of throughput in the prior art. In this case, since both channels 2 and 4 of normal TCP+TGW have had the same result, they are plotted by a single line.

As shown in FIG. 12, it become evident that reduction in the throughput can be prevented even if the transmission error is present. This is because the error recovery function of SSCOP and the link-by-link flow control when TGW is employed can operate more effectively than the error recovery function of TCP and the end-to-end flow control.

3-3) Comparison with TCP With Window Scale Option Under the Circumstances Including the Congestion Situation Setting (1)

In the case of the normal TCP+TGW, the total throughput has been 35.9 Mbps, while all throughputs of individual connections have been 17.95 Mbps. In the case of the TCP with the window scale option, the total throughput has been 31.4 Mbps, while throughputs of individual connections have been 18.6 Mbps and 13.6 Mbps in the worst case. From these results, it can be understood that the balanced communication having the high utilization efficiency of the line can be accomplished by TGW. The reason for the above may be supposed as follows. That is, the congestion is generated to execute the end-to-end flow control in TCP with the window scale when the data are output to DS-3 from the ATM switch, whereas no congestion is generated in TGW because the HTP packet can be transmitted at the transmission rate to mate with the DS-3 line while controlling the transmission from the terminal by the TCP side.

Situation Setting (2)

In the case of the normal TCP+TGW, the throughput of the connection 1 being started first is 18 Mbps, and the throughput of the connection 2 being started next is 17.9 Mbps. In contrast, in the case of TCP with the window scale option, the throughputs of the connections 1 and 2 are 19.2 Mbps and 14.3 Mbps respectively. From these results, in addition to the finding derived in the situation setting (1), the balanced throughput can be provided to the connection in which TGW is added later. This is because, in addition to the above reason derived in the situation setting (1), the slow start procedures which are taken to avoid the congestion in TCP in the transmitter side terminal can be quickly ended in TGW by terminating the flow control between the transmitter side TCP and TGW in the circumstance with the smaller delay.

Situation Setting (3)

Results of communication experiments executed in compliance with the situation setting 3 are shown in FIG. 13. The normal TCP+TGW has higher values of both the total throughput and individual throughputs than TCP with the window scale option (WSO). Especially, in the normal TCP+TGW, the throughput of the small quantity of data transmission has been 17.3 Mbps, the total throughput has been 34.5 Mbps, and throughput of the large quantity of data transmission has been able to be improved considerably. These results may be derived due to the same reasons as those in the situation settings (1) and (2).

As described above, in the TCP communication speed improving system according to the present invention, while limiting an amount of buffer requested from the transmitter side terminal, the line bandwidth can be employed effectively and equally not depending on the number of connection. Therefore, effective buffer utilization can be achieved if a plurality of TCP connections are to be handled.

It should be understood that many modifications and adaptations of the invention will become apparent to those skilled in the art and it is intended to encompass such obvious modifications and changes in the scope of the claims appended hereto.

What is claimed is:

1. A TPC communication speed improving system which is attached to both ends of a wide area network construction by connecting a plurality of LANs together, the network being able to establish data communication using TCP/IP, the system comprising:

a packet processing means which has a packet relay function in a data link layer of an OSI reference model, and provides processes up to TCP in a transport layer in the OSI reference model to a received packet;

a terminating means for terminating TCP flow control and retransmission control of TCP packets which are input from a transmitter side terminal, in place of a receiver side terminal;

a first packet transferring means for transferring the packet to another TCP communication speed improving system which is located on an opposite side via the wide area network, by using peculiar flow control procedures and selective retransmission procedures using service specific connection oriented protocol (SSCOP) in the data link layer; and a second packet transferring means for transferring the packet to the receiver side terminal in accordance with the TCP flow control and the retransmission control, in place of the transmitter side terminal;

wherein processes of the terminating means, the first packet transferring means, and the second packet transferring means can be provided simultaneously to a plurality of TCP connections.

2. A TCP communication speed improving system according to claim 1, wherein, in relation to another TCP communication speed improving system which is located on the opposite, each flow control for each TCP connection is carried out based on a large window size according to a delay, while a flow control for all TCP connections is carried out.

* * * * *